United States Patent
Clark

(10) Patent No.: US 7,107,365 B1
(45) Date of Patent: Sep. 12, 2006

(54) EARLY DETECTION AND GRANT, AN ARBITRATION SCHEME FOR SINGLE TRANSFERS ON AMBA ADVANCED HIGH-PERFORMANCE BUS

(75) Inventor: Gordon R. Clark, Meridian, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 266 days.

(21) Appl. No.: 10/183,141

(22) Filed: Jun. 25, 2002

(51) Int. Cl.
*G06F 13/00* (2006.01)

(52) U.S. Cl. .......................... 710/35; 710/110; 710/113

(58) Field of Classification Search ........ 710/113–118, 710/240–244, 309
See application file for complete search history.

(56) References Cited

U.S. PATENT DOCUMENTS

| | | | | |
|---|---|---|---|---|
| 5,193,193 A | * | 3/1993 | Iyer | 710/117 |
| 5,377,331 A | * | 12/1994 | Drerup et al. | 710/113 |
| 5,835,969 A | * | 11/1998 | Inagaki et al. | 711/217 |
| 5,940,875 A | * | 8/1999 | Inagaki et al. | 711/217 |
| 6,023,748 A | * | 2/2000 | Peters et al. | 711/151 |
| 6,438,635 B1 | * | 8/2002 | Date et al. | 710/113 |
| 6,477,598 B1 | * | 11/2002 | Yu | 710/240 |
| 6,651,148 B1 | * | 11/2003 | Widdup | 711/158 |
| 6,671,761 B1 | * | 12/2003 | Kim | 710/244 |
| 6,681,285 B1 | * | 1/2004 | Ng | 710/309 |
| 6,721,836 B1 | * | 4/2004 | Kim | 710/240 |
| 6,745,273 B1 | * | 6/2004 | Gehman et al. | 710/113 |
| 6,769,046 B1 | * | 7/2004 | Adams et al. | 710/316 |
| 6,772,254 B1 | * | 8/2004 | Hofmann et al. | 710/110 |
| 6,775,727 B1 | * | 8/2004 | Moyer | 710/113 |
| 2001/0042147 A1 | * | 11/2001 | Adams et al. | 710/100 |
| 2002/0129181 A1 | * | 9/2002 | Lahiri | 710/113 |
| 2002/0199052 A1 | * | 12/2002 | Moyer | 710/113 |
| 2003/0058837 A1 | * | 3/2003 | Denney | 370/352 |
| 2003/0101307 A1 | * | 5/2003 | Gemelli et al. | 710/305 |
| 2003/0204651 A1 | * | 10/2003 | Kuronuma et al. | 710/22 |
| 2003/0229741 A1 | * | 12/2003 | Stuber et al. | 710/110 |

FOREIGN PATENT DOCUMENTS

JP         55134435 A    * 10/1980

OTHER PUBLICATIONS

AMBA AHB Specification Revision 2.0.

* cited by examiner

*Primary Examiner*—Glenn A. Auve
(74) *Attorney, Agent, or Firm*—Marger Johnson & McCollom, P.C.

(57) ABSTRACT

A system on a chip (SOC) bus architecture may comprise a plurality of masters operable to request communications over a AMBA-type bus. An arbiter may receive requests and burst control signals directly from the masters. The arbiter may determine a burst length associated with a request and may also grant a master allowance to access the bus. The arbiter may configure a multiplexer to couple the granted master to the bus dependent on the determined burst length.

18 Claims, 5 Drawing Sheets

(SYSTEM AND BUS ARCHITECTURE)

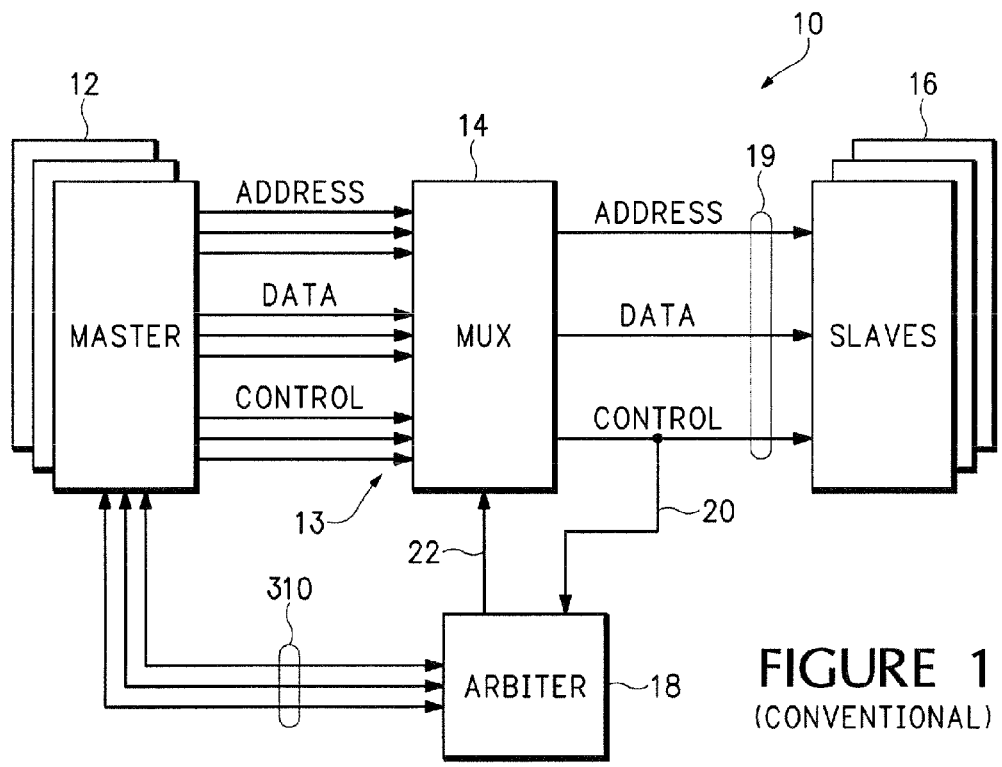
FIGURE 1
(CONVENTIONAL)
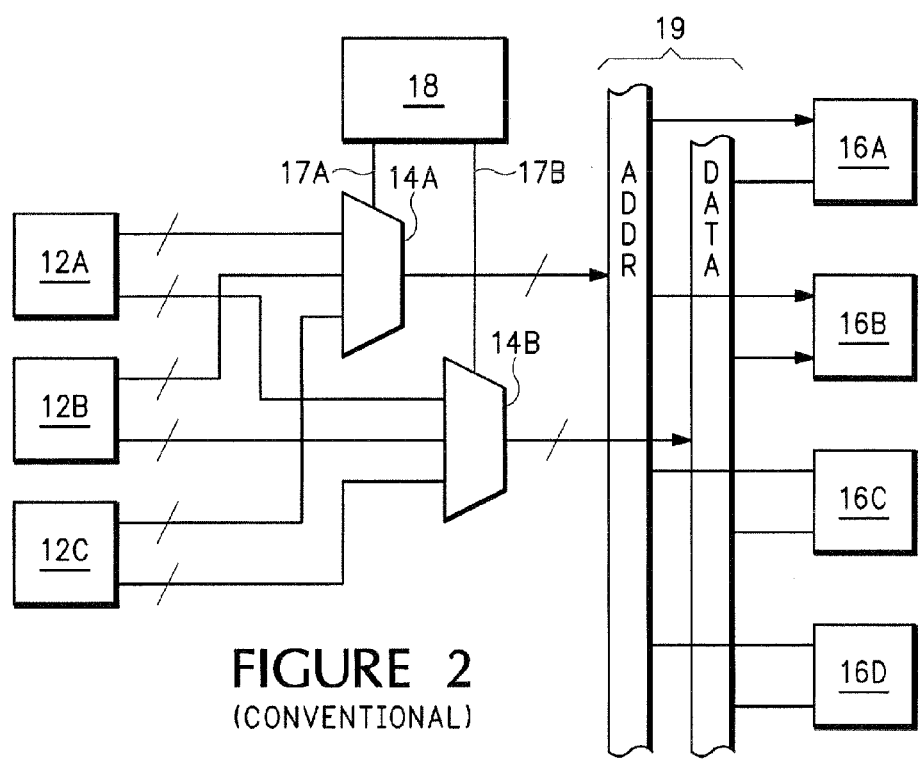
FIGURE 2
(CONVENTIONAL)

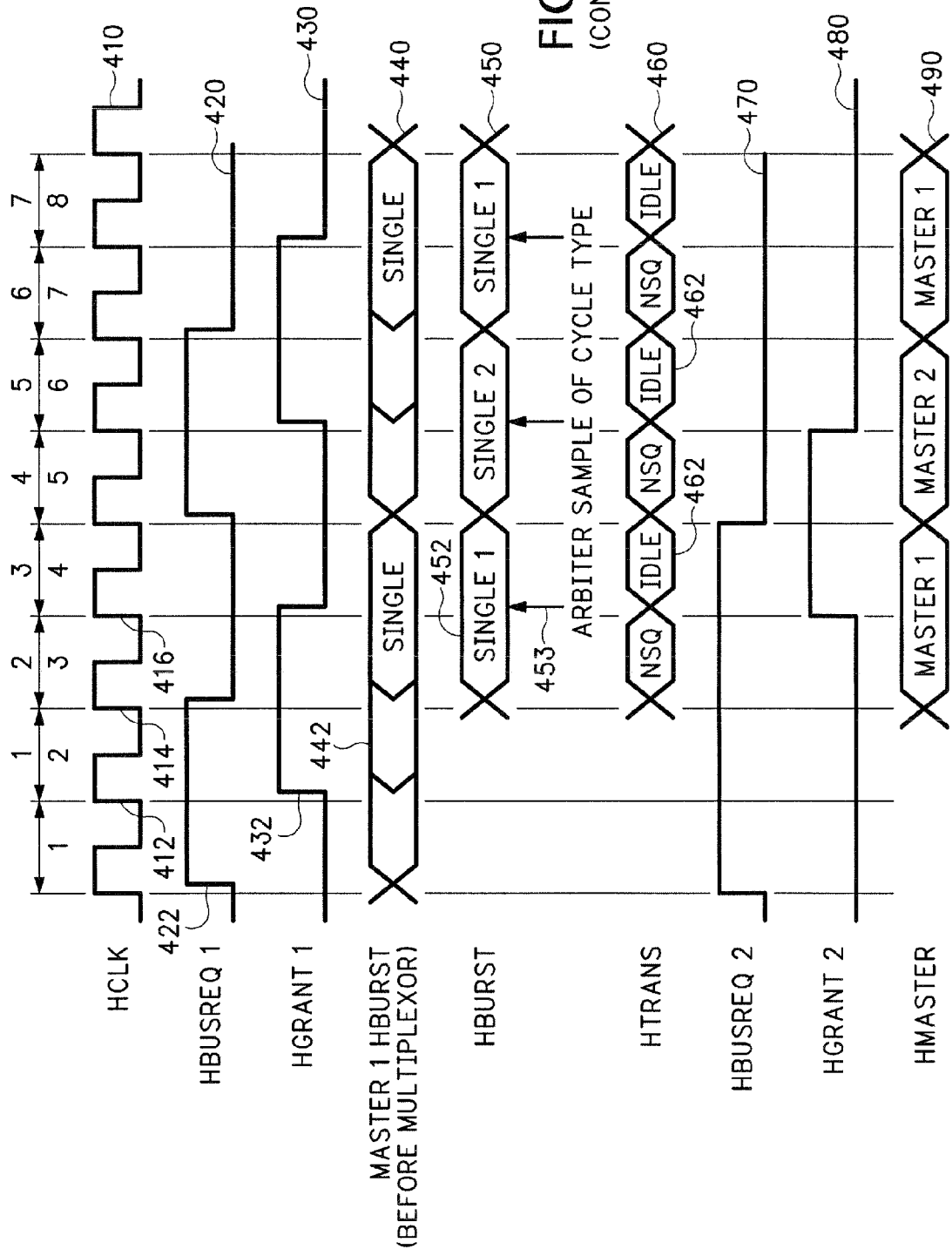
FIGURE 3
(CONVENTIONAL)

(SYSTEM AND BUS ARCHITECTURE)

EARLY DETECTION AND GRANT, AN ARBITRATION SCHEME FOR SINGLE TRANSFERS ON AMBA ADVANCED HIGH-PERFORMANCE BUS

BACKGROUND OF THE INVENTION

The present disclosure is related to a bus architecture and its method of operation. More particularly, the present disclosure is related to bus architectures and operations that support burst and pipelined transfers.

The Advanced Microcontroller Bus Architecture (AMBA) standard is an open industry bus architecture that may be used for System on Chip (SoC) designs. The bus architecture may incorporate a variety of system components that may include, e.g., a micro-controller, memory interface and blocks of peripheral interface logic. The AMBA architecture may support bandwidths of external memory and an internal bus, on which the microcontroller, on-chip memory and other Direct Memory Access (DMA) type devices may reside. To sustain these bandwidths, the AMBA bus architecture may use different hierarchies of bus interfacing for different transfer applications. High-bandwidth interfacing may be used between components involved with the majority of data transfers; while lower-bandwidth interfacing may be used for the less frequent communication applications.

For example, a high bandwidth bus, e.g., which may be known as an Advanced High-performance Bus (AHB), may be used as a bus interface to a device with on-chip memory and DMA type devices that may support burst and pipelined data transfer procedures. For the pipelined operations, bus grants may be presented before address and control signals, which in turn may be presented before the data. Additionally, the grants, address and control signals of one transfer may overlap the data of a previous transfer(s).

To interface lower bandwidth peripheral devices, a lower bandwidth bus may be used. A bridge may link between the two different buses. For example, a bridging device may interface an AHB-type bus to a peripheral bus. The bridge may allow operations of the higher level bus to proceed while lower bandwidth applications may be concluded or performed on the lower bandwidth bus as might be associated with peripheral interactions, e.g., such as a keyboard, mouse, printer and a programmable input/output. Such peripheral devices may also comprise memory-mapped register interfaces of low-bandwidth protocols, which may allow access under programmable control.

Procedures of the higher performance bus may be referenced as serving a plurality of masters and slaves. For example, a multiplexer may select which of the plurality of masters may drive the address and control signals over the bus. Additionally, one of the masters, as a granted master, may likewise send data across the bus. Or, in an opposite direction (e.g., of a read procedure versus a write procedure), a multiplexer may determine a "slave" of the plurality of slaves to access the bus for sending its data to be read by a "master". But for purposes of simplicity, the present disclosure, hereinafter, shall reference sourcing devices as "masters".

In a transfer application, a master may first request access to the bus independent of other possible masters. An arbiter may receive a request and may grant a master access to the bus for transfer operations. The granted bus master of conventional bus architecture may drive the bus with address and control signals to establish parameters of the transfer. The parameters may include, e.g., destination address, direction and size for the transfer. Additionally, the information may establish a packet type, which may indicate a number of packets to be associated with a burst type transfer.

Accordingly, each transfer application may include a plurality of cycles, e.g., grant, address/control and data. The grant cycle may include granting a designated master to access the bus, the address and control cycle may communicate the parameters of the transfer, and other data cycle(s) may be used for the data. An arbiter establishes when a master is to be granted access to the bus. The arbiter may also establish a given start-time and duration for the coupling of the granted master to the bus to avoid multiple masters from driving the bus simultaneously. Typically, such granted masters will, thus, complete transfer procedures before another master is coupled to the bus.

For such high performance bus architectures, it may be understood that the burst and pipelined queuing procedures may include latencies for setting-up the data transfers. As used herein, "latency" may reference durations that may be associated with set-up, e.g., deriving grants, configuring multiplexers and determining transfer parameters. These latencies may seem excessive when not utilizing full capacity burst-type transfers.

In other words, the operative procedures of the conventional burst and pipelining type high-performance buses may seem inefficient for the handling of, e.g., single burst transfers. If every bus master of the bus were using single burst transfers, bus efficiency would drop. For this conventional high-performance-type bus architecture—i.e., of the burst and pipelining operative procedures—the burst type signal of a granted master may be read from an egress side of an access multiplexer. The burst type signal may be read via the multiplexer and after granting the master and coupling it to the bus. Thus, when handling these transfers of single-burst-type, an arbiter might be limited to only one grant for every other bus cycle.

SUMMARY

In accordance with an exemplary embodiment, a computer system comprises at least one master operable to request communications over a bus. An arbiter is operable to receive requests from the masters. The arbiter may be further operable to grant a master's access request and to couple it to the bus based upon a determined burst length associated with the request of the master.

In accordance with a further embodiment, the arbiter may be configured to receive a burst control signal of at least one of the masters directly therefrom. In another embodiment, the arbiter may be further operable to alternatively receive a burst type control signal from the bus via an egress side of an access multiplexer.

In another exemplary embodiment of the present invention, a method of arbitrating a bus access comprises receiving a request for communications from a master. A burst length may be determined for the communication request and the master may be granted permission to access the bus. The granted master may then be coupled to the bus dependent on the determined burst length.

In a further exemplary embodiment, a multiplexer may be configured for the coupling of the granted master to the bus for a single bus cycle if the determining establishes a single burst length.

BRIEF DESCRIPTION OF THE DRAWINGS

Embodiments and features of the invention will become apparent from the detailed description and the appended claims, with reference to the accompanying drawings, in which:

FIG. 1 is a simplified schematic illustrating a conventional bus architecture.

FIG. 2 is a simplified schematic of a burst and pipeline operable bus architecture with an address/control multiplexer and a data multiplexer.

FIG. 3 is a timing diagram showing exemplary operation of a burst and pipeline operable bus architecture.

DETAILED DESCRIPTION

Figure 4:
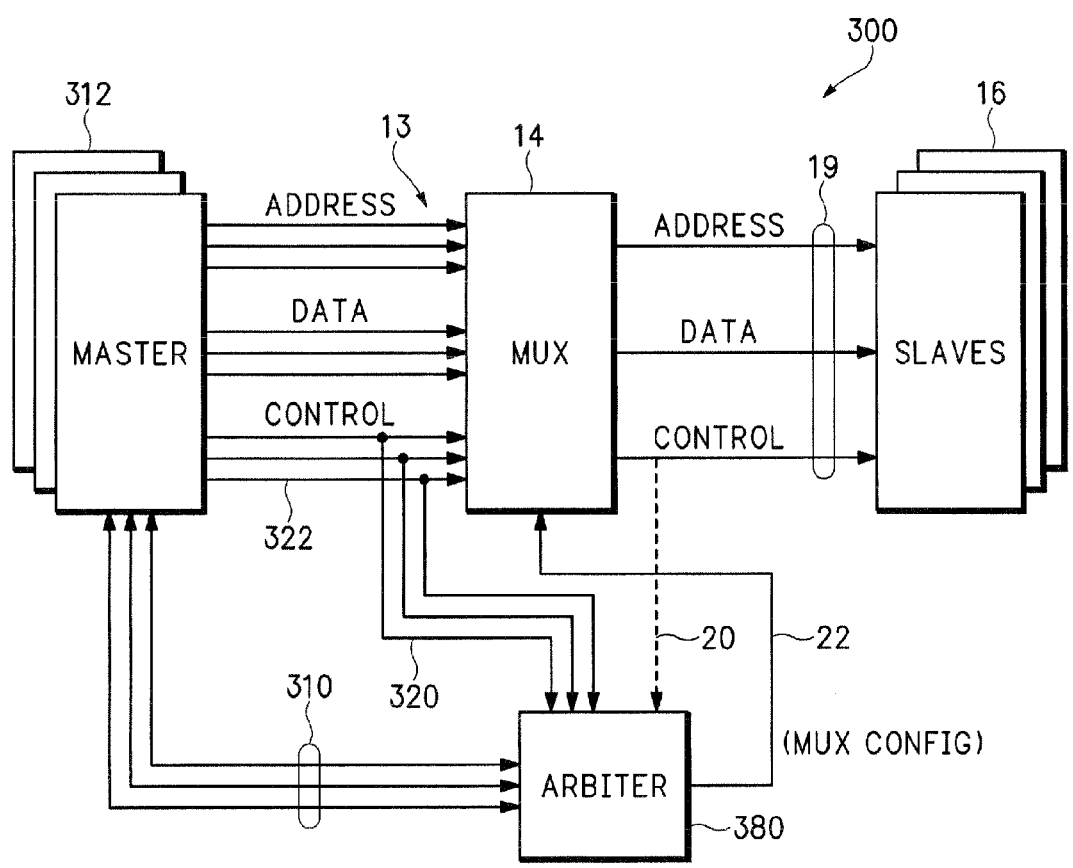
FIG. 4 is a simplified schematic showing a high performance bus architecture of an exemplary embodiment of the invention.

In the following description, numerous specific details are set forth to provide an understanding of exemplary embodiments of the present invention. It will be understood, however, that alternative embodiments may comprise sub-combinations of the disclosed exemplary embodiments.

Additionally, readily established circuits of the exemplary embodiments may be disclosed in simplified form (e.g., block diagram style) to avoid obscuring an essence of the embodiments with excess detail. Likewise, to aid a clear and precise disclosure, the description of their operations—e.g., timing considerations and the like—may similarly be simplified when persons of ordinary skill in this art can readily understand their operations.

As used herein, "bus cycle" may be used to reference a basic unit of one clock period of a bus clock. "Burst" operation may reference operation where one or more data transactions, initiated by a bus master, are associated with a given transfer. Data of each sequential transaction or transfer may be placed in incremental regions of an address space.

"Master" will reference a device that is able to initiate a data transfer procedure by providing address and control information. "Slave" will reference a device responsive to the data transfer procedure within a given address-space. A slave may also send a signal back to a master to provide status information for a transfer—e.g., success, failure or wait for the data transfer.

FIG. 1 shows a bus architecture, which may include a high performance bus 19, e.g., such as an Advanced High performance Bus (AHB). A given master of a plurality of masters 12 may send address, data, and control signals through multiplexer 14 to bus 19. Arbiter 18 may decide which of the plurality of masters 12 may be granted access to the bus and for how long (measured in bus cycles or transfer beats). Accordingly, multiplexer 14 may couple the address, data and control signals of a granted master (from amongst the plurality of masters 12) to bus 19 so that the signals may be transferred by the bus to slave(s) 16.

In FIG. 1, multiplexer 14 is shown simplistically. It shall be understood, however, that multiplexer 14 may comprise a plurality of separate switching networks. For example, with reference to FIG. 2, a first multiplexer 14A may be dedicated for routing of address and control signals; while a second multiplexer 14B may be dedicated to the handling and routing of data signals. Arbiter 18 controls the configurations of these multiplexers using separate configuration signals 17A and 17B and may enable their operations for pipelined flows over the bus.

Arbiter 18 assures that only one master at a time is allowed to initiate a given data transfer across the bus. In doing so, the arbiter may employ any arbitration algorithm. In a particular example, the arbiter may employ a highest priority first arbitration algorithm. For this scheme, the masters may be assigned priority rankings and the requests of the masters may be arbitrated based on their relative priorities.

Continuing with reference to FIGS. 1–3, when a master 12 needs to access the bus 19, e.g., for a data transfer operation of conventional high performance bus architecture, it may send a request (see HBUSREQ1 signal 420 of FIG. 3) along request lines 310. A rising edge 422 or activation of the bus request signal may occur during any time within a period of the bus clock HCLK 410. At the first clock edge 412 of the bus clock following the request, the arbiter will receive the request for processing by an arbitration algorithm. Based on the arbitration algorithm, the arbiter will determine if and when to grant the master access (see the HGRANT 1 signal 430 of FIG. 3).

Typically, masters 12 encode a burst length in a burst type control signal 440, e.g., HBURST, that may be delivered to a burst control line 20 of the high-performance bus 19. Signal 440 of FIG. 3 shows a timing relationship for how the signal of a first master may appear at an ingress side 13 the multiplexer. Signal 450 comprises a time-multiplexed combination of different HBURST signals of different masters at the egress side of the multiplexer.

With respect to burst types, different burst transfer types may be defined with various beat count options for the HBURST type control signals. Once a bus has been granted access, arbiter 18 may additionally couple the granted access for continued beat counts as previously requested by the master and as predetermined by the arbiter based on a decoding of the burst type control signal (e.g., HBURST). Ideally, the bus allocation procedures would insure that each bus cycle might be coordinated with a valid transfer beat.

In certain conventional embodiments, further referencing FIGS. 1–3 arbiter 18 may grant a requesting master 12 using activation 432 of a master grant signal 430. The arbiter may also transfer bus ownership to the granted master using control signals 490 as applied to control inputs 22 of the multiplexer. The activation of the master grant signal and the transfer of bus ownership may be synchronous with a rising edge 412 of bus clock 410.

With the transfer of the bus ownership 432 (FIG. 4), multiplexer (e.g., 14A of FIG. 2) may be configured to couple the address and control signals of a granted master to bus 19. In the conventional high performance bus architectures, e.g., with reference to FIGS. 1–3, the burst type control signal (HBURST) 440 of the granted master may be propagated to the bus synchronous with the next rising (e.g., single) edge 414 of the bus clock. The burst type control signal 440 may establish a burst type 442 (e.g., single) that is applied to the ingress side 13 of the multiplexer. The multiplexer outputs the condition to the bus at its egress side to establish a condition 452 of the HBURST control signal 450 on bus 19. The condition is passed to the bus via the multiplexer given that it has been previously configured to select the granted master. At the next (e.g., rising) edge 416 of the bus clock 410, the burst control signal may be sampled 453 by the arbiter to determine the burst type.

Such conventional procedure of a high performance bus (AHB) 19, where the sampling of the burst type is obtained from a burst control signal of the bus at an egress side of multiplexer 14, may be noted to require a minimum of two bus cycles for bus allocation. In other words, the conventional procedure may require one bus cycle after arbiter 18 has asserted a grant before transitioning a multiplexer configuration to select a newly granted master. Another bus cycle may then elapse before sampling and determination of a burst type of a burst control signal 450 from the burst control line 20 of the bus.

Subsequent data pipelining coordination by the arbiter may ensue to enable a data multiplexer (14B of FIG. 2) to carry forward queued data communications of the granted masters. The resultant data communications of the conventional high performance architecture may be represented by the bus transaction signal 460 of timing diagram of FIG. 3.

In effect, once a master is granted bus access in such conventional high performance bus architectures, it may require one bus cycle for a granted master's 12 burst type control signal to propagate through multiplexer 14. A second bus cycle may then pass before the arbiter 18 may sample the burst type control signal 450 as presented on the bus (at the egress side of the multiplexer). In other words, for the conventional high performance bus, only after the master has been granted access and the multiplexer reconfigured may the arbiter then sample and determine a burst type desired for establishing data transfer set-ups and durations. Accordingly, the conventional bus architecture may be noted to limit arbiter 18 to issuance of one bus grant per every other bus cycle. Thus, as further illustrated by the conventional timing diagram of FIG. 3, data transactions of a data signal 460 of the conventional high performance bus include idle durations (i.e., bubbles) 462 every other clock cycle.

In accordance with an exemplary embodiment of the present invention, referencing FIG. 4, a master 312 of a high performance bus architecture 300 may pass a bus request (transition 422 of HBUSREQ1 signal 420 of FIG. 5) along request lines 310 to arbiter 380. Additionally, the master may send a burst type control signal 440' to respective control line inputs 320 of the arbiter. When submitting the request, master 312 will be ready to receive activation 432' of a bus grant from arbiter 380 by the next bus cycle 414.

Figure 5:
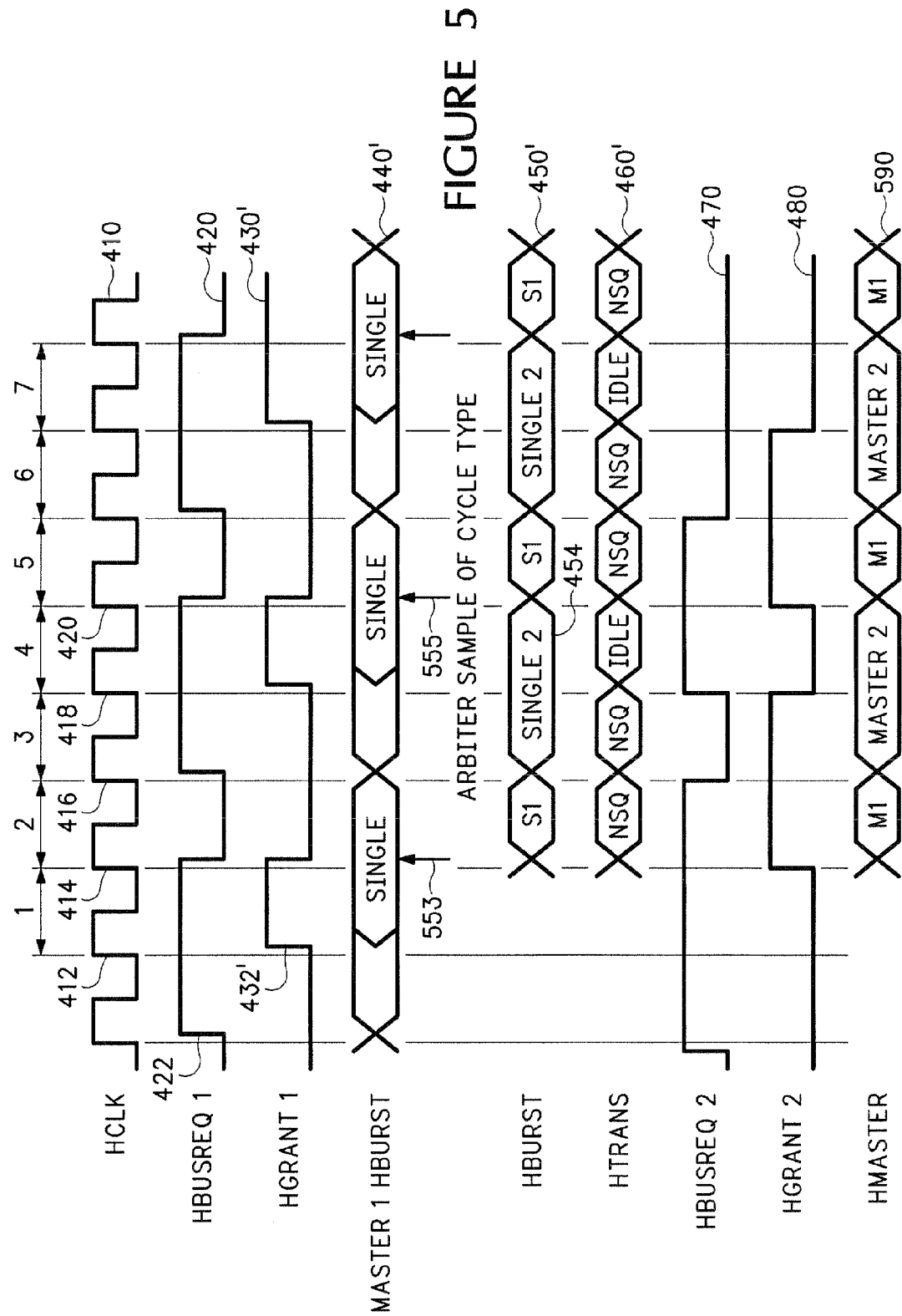
FIG. 5 is a timing diagram showing operation of a high performance bus architecture for an exemplary embodiment of the present invention.

That is, further referencing FIGS. 4–5, master 312 sends control signals for the conditioning of the bus transaction so that they may be available at the time it receives a grant issuance from the arbiter with the next edge 412 of the bus clock 410 after the bus request 422. In this embodiment, each master 312 uses a separate control bus 322 that may be applied to multiplexer 14. Having separate lines, each master 312 may send out control signals together with their bus request. In this embodiment, the number of transfer beats (SINGLE) for the burst type control signal 440' is provided at the same time that the master 312 outputs its bus request 422. Therefore, the burst type signal may be available for use by the arbiter before the multiplexer configuration, which may occur with the next clock edge 414 (FIG. 5).

Arbiter 380 can, therefore, receive the burst type control signal 440' directly from the masters (at the ingress side 320 of multiplexer 14) and may determine a number (e.g., SINGLE) of requested bus cycles before the signal might otherwise be available on the bus 19 (i.e., signal 450' at the egress side of the multiplexer). This early presentation of the burst type control signal may allow arbiter 380 to more readily sample 553 and determine the burst type to assist single burst data transfers than what might otherwise be available from the bus. Thus, bus tenures may be kept within a single bus cycle.

In a particular example, further referencing FIG. 4, master devices may request single transfer operations (HBUSREQ1 and HBUSREQ2 signals 420, 470 of FIG. 5). The communications may be associated with point-to-point communications of, e.g., a master to master, a master to a different slave or a master to memory. CPU 312, for example, may need to perform a single transfer to write memory, or registers, of a peripheral device, such as a programmable Input/Output device. Such operation may call for determining error information, reading status information, polling registers, interrupting a slave, programming a programmable input/output for establishing a serial bus configuration, writing a single byte at a time to a port, sending instructions to an intelligent peripheral, etc. Regardless, upon initiation of such single burst type procedures over the high performance bus architecture, arbiter 380 may read the burst type control signal of the requesting master on lines 320 at the ingress side 13 of multiplexer 14. The arbiter 380 may take advantage of such early availability of the burst type control signal, i.e. established with assertion 422 of bus request 420.

Further referencing FIGS. 4 and 5, in another operating mode, the arbiter 380 may additionally be operable to alternatively receive the burst type control signal 450' of a second request 470 from the bus 19 at the egress side of multiplexer 14. In this operating embodiment, an early delivery of the burst type signal, e.g., from a second requesting master would not be required. And the arbiter may sample and determine the information via such input 20 (phantom interconnect of FIG. 4).

Thus, a first master may have a burst control signal sampled 553 (at the multiplexer ingress) with the single cycle bus tenure. A second master, on the other hand, may provide its burst type control signal via the multiplexer and be sampled alternatively by the arbiter at different relative sample point 555 per a two cycle bus tenure.

Although the transfer applications of FIG. 5 show single transfer arbitrations and operation, it will be understood that the scope of the present invention includes alternative operations that may incorporate single burst transfers of single cycle bus tenure intermixed with larger burst transfers. In such alternative exemplary embodiments, the early burst type detection and grant scheme may be associated with masters that perform frequent single transfers, e.g., such as a processor or micro-controller. Other masters, which might not employ the early burst delivery and detection procedures (e.g., the procedures of the second master of FIG. 5), may supply control signals to the arbiter via the bus and multiplexer egress.

Figure 6:
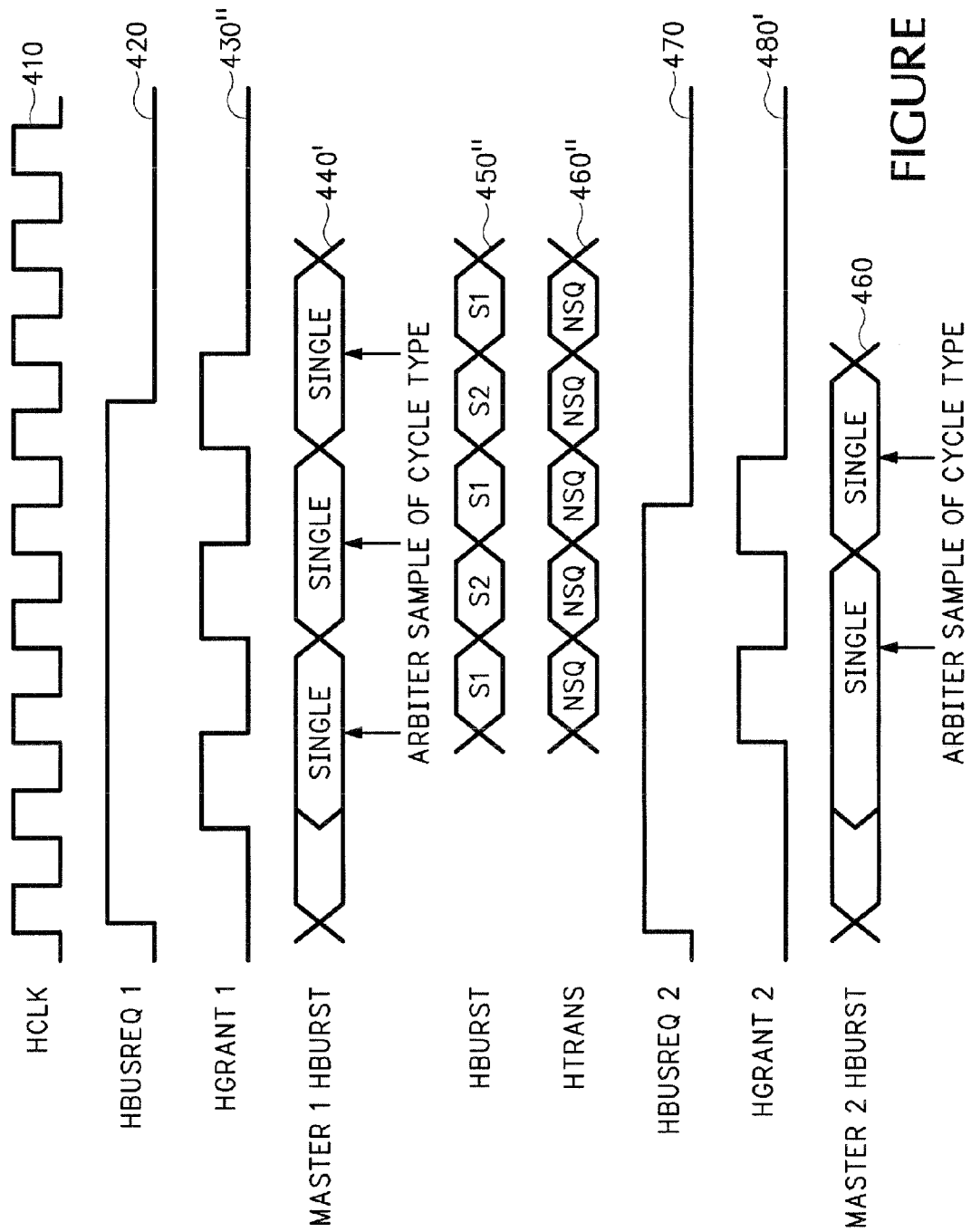
FIG. 6 is a timing diagram showing operation of a high performance bus architecture for another exemplary embodiment of the present invention.

In a further example, referencing FIG. 6, two masters, Master 1 and Master 2, submit successive single transfer requests. They both submit their burst types 440', 640 directly to the arbiter together with their respective requests 420, 470. In this example, bus tenures of single clock cycles will service their single burst transfer applications. As shown by the transfer signal 460" (FIG. 6) for this embodiment, the requests and transfers may be performed without idle cycles. Referencing FIG. 4, for such embodiment, each master 312 may route its burst type control signals along control lines 320 coupled directly to arbiter 380.

It will be apparent to those skilled in this art that the illustrated embodiments are exemplary and that various changes and modifications may be made thereto as become apparent upon reading of the present disclosure. Accordingly, such changes and modifications are considered to fall within the scope of the appended claims.

Further, the specification may refer to "an", "one", "another", or "some" embodiment(s) in various locations. It will be understood, however, that such use does not necessarily mean that each such reference is directed to the same embodiment(s), or that the features thereof only apply to a single embodiment.

What is claimed is:

1. A System On a Chip (SOC) comprising:
   an Advanced High-performance type Bus (AHB) according to an Advanced Microcontroller Bus Architecture (AMBA);
   masters, each master configured to transmit a bus request signal and a burst type control signal;
   an arbiter configured to receive the bus request signals and the burst type control signals, the arbiter configured to grant one of the masters access to the AHB based upon a burst length determined from the respective burst type control signal; and
   a multiplexer configured to selectively couple the one of the masters to the AHB in response to a control signal from the arbiter, the arbiter configured to sample one of the burst type control signals from an ingress side of the multiplexer.

2. The SOC of claim 1, the arbiter configured to enable the selective coupling for a duration of one bus cycle when determining a single burst length for the one of the masters.

3. The SOC of claim 1, the arbiter configured to receive the one of the burst type control signals directly from one of the masters.

4. The SOC of claim 3, the arbiter further configured to receive another one of the burst type control signals originating from another one of the masters from an egress side of the multiplexer.

5. The SOC of claim 1, further comprising at least one slave coupled to the AHB, the at least one slave including a device selected from the group consisting of a bus bridge, a memory interface, and a memory and network interface.

6. The SOC of claim 1, the multiplexer comprising:
   a first portion configured to route address and control signals; and
   a second portion configured to route data signals.

7. The SOC of claim 1, at least one of the masters selected from the group consisting of a microcontroller, a direct memory access device (DMA), and a digital signal processor (DSP).

8. A method of arbitrating access to an Advanced High-performance Bus (AHB) according to an Advanced Microcontroller Bus Architecture (AMBA), the method comprising:
   simultaneously receiving from a master a bus request signal and a burst type control signal;
   decoding the burst type control signal to determine a burst length;
   granting the master permission to access the AHB; and
   coupling the master to the AHB for a period of time that is dependent upon the burst length.

9. The method of claim 8, wherein receiving the burst type control signal comprises receiving the burst type control signal directly from the master and wherein coupling the master to the AHB comprises configuring a multiplexer to couple the master to the AHB when the burst length consists of a single burst.

10. The method of claim 9, wherein receiving the burst type control signal directly from the master comprises sampling the burst type control signal at an ingress side of the multiplexer.

11. The method of claim 10, wherein sampling the burst type control signal, decoding the burst type control signal, and granting the master permission are all performed within a single AHB cycle.

12. The method of claim 8, wherein decoding the burst type control signal and granting the master permission are both performed within a single AHB cycle.

13. The method of claim 8, further comprising:
   after decoding the burst type control signal and granting the master permission to access the AHB, driving data from the master to the AHB for a single AHB cycle; and
   driving data from another master to the AHB for at least the AHB cycle immediately following the single AHB cycle.

14. A bus architecture for a system on a chip (SOC), the bus architecture comptising:
   masters, each master having a bus request output and a burst type control signal output;
   a multiplexer configured to selectively couple one of the masters to a bus, the multiplexer linked directly to each of the burst type control signal outputs by a control bus; and
   an arbiter having control line inputs and request inputs, each request input coupled to a respective bus request output by a request line, the arbiter configured to read the burst type control signal outputs directly from the masters.

15. The bus architecture of claim 14, the multiplexer comprising:
   an address control multiplexer configured to deliver address and control signals from the granted master over the bus to at least one slave, wherein the arbiter is configured to read the burst type control signals from an ingress side of the address/control multiplexer; and
   a data multiplexer configured to deliver data signals from the granted master over the bus to the at least one slave, wherein the arbiter is configured to control the data multiplexer and the address/control multiplexer for pipelined transfers of the data signals and the address and control signals over the bus.

16. The bus architecture of claim 15, the arbiter alternatively configured to receive the burst type control signals from an egress side of the address/control multiplexer.

17. The bus architecture of claim 16, wherein the arbiter is configured to decode the burst type control signal outputs to determine a burst count associated with each bus request signal and to designate the one of the masters based upon the determined burst count, the decoding and designating occurring within a single bus cycle.

18. The bus architecture of claim 14, wherein the bus comprises an Advanced High-performance Bus (AHB) according to an Advanced Microcontroller Bus Architecture and the arbiter is configured to read a burst transfer type from the burst type control signal outpt.

* * * * *